United States Patent [19]

Rohr et al.

[11] Patent Number: 4,609,609
[45] Date of Patent: Sep. 2, 1986

[54] UV-ABSORBENT COMPOUNDS, PROCESS FOR THEIR PREPARATION AND THEIR USE AS IMAGE DYES IN PHOTOGRAPHIC MATERIALS FOR THE SILVER DYE BLEACH PROCESS

[75] Inventors: Thomas-Markus Rohr; Jakob Kuhn, both of Marly, Switzerland

[73] Assignee: Ciba Geigy AG, Basel, Switzerland

[21] Appl. No.: 757,549

[22] Filed: Jul. 19, 1985

[30] Foreign Application Priority Data

Jul. 24, 1984 [CH] Switzerland ............... 3577/84

[51] Int. Cl.$^4$ .......................... G03C 1/40; G03C 5/18; G03C 5/52
[52] U.S. Cl. .......................... 430/146; 430/5; 430/390; 430/512; 430/561; 430/563
[58] Field of Search ............... 430/561, 563, 512, 390, 430/5, 146

[56] References Cited

U.S. PATENT DOCUMENTS 3,533,799 10/1970 Nickel et al. .................. 430/563
3,585,039 6/1971 Kabitzke et al. .............. 430/563

*Primary Examiner*—Richard L. Schilling
*Attorney, Agent, or Firm*—Joseph G. Kolodny

[57] ABSTRACT

Compounds of the formula

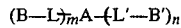 (1), in which A is the radical of a bisazo or trisazo dye, L and L' are organic radicals and B and B' are cyclic organic radicals and at least one of the radicals B and B' has spectral absorption in the UV region and one of the radicals B and B' is different from 2,4-dihydroxyphenyl, m is 1 or 2 and n is 0, 1 or 2.

The compounds are suitable for use as image dyes in photographic silver dye bleach materials.

3 Claims, No Drawings

UV-ABSORBENT COMPOUNDS, PROCESS FOR THEIR PREPARATION AND THEIR USE AS IMAGE DYES IN PHOTOGRAPHIC MATERIALS FOR THE SILVER DYE BLEACH PROCESS

The present invention relates to UV-absorbent compounds, a process for their preparation and their use as image dyes in photographic materials for the silver dye bleach process.

UV-absorbent compounds which can be used as image dyes in photographic materials for the silver dye bleach process permit the use of these materials wherever exposure to UV light or light having a high UV content plays a part. For example, diazotype materials are imagewise exposed by means of mercury vapour lamps whose light has a high and intensive UV content. If the original which is to be transferred to such diazotype materials is an original prepared from silver dye bleach material, the image dyes contained in this silver dye bleach material should thus have high absorption not only in the visible region but also in the ultraviolet region. To allow visual assessment of the images it is of advantage for the image dyes to be dark, i.e. to absorb across a very large portion of the visible spectrum.

The present invention thus has for its object the provision of compounds which have spectral absorption in the UV region as well as in virtually the entire region of the visible spectrum and which are suitable for use in photographic silver dye bleach material.

It has now been found that the compounds of the formula (1) below substantially meet these requirements.

The present invention accordingly provides compounds of the formula $$(B-L)_m-A-L'-(B')_n \quad (1),$$

in which A is the radical of a bisazo or trisazo dye, L and L' are identical or different from each other and denote bridge members, B and B' are identical or different from each other and denote aromatic radicals, at least one of the radicals B and B' having spectral absorption in the UV region and one of the radicals B and B' being different from 2,4-dihydroxyphenyl, and m is 1 or 2 and n is 0, 1 or 2.

The present invention also provides the preparation of the novel compounds of the formula (1), their use as image dyes in photographic silver dye bleach materials, the photographic silver dye bleach materials containing these image dyes, in particular monochromic silver dye bleach materials, and the use of images prepared from these materials as originals in the exposure of diazotype material.

In the compounds of the formula (1), A is the radical (chromophore) of a bisazo or trisazo dye. Preferably A can be represented by the formulae

   —E—N=N—D—N=N—E'   (2),

   —E—N=N—D—N=N—E'—   (3),

   —E—N=N—D—N=N—D'—N=N—E'   (4) or

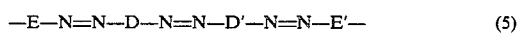   —E—N=N—D—N=N—D'—N=N—E'—   (5)

The radicals E, E', D and D' can be identical or different and are preferably aromatic radicals. Examples of suitable aromatic radicals are those of the formula

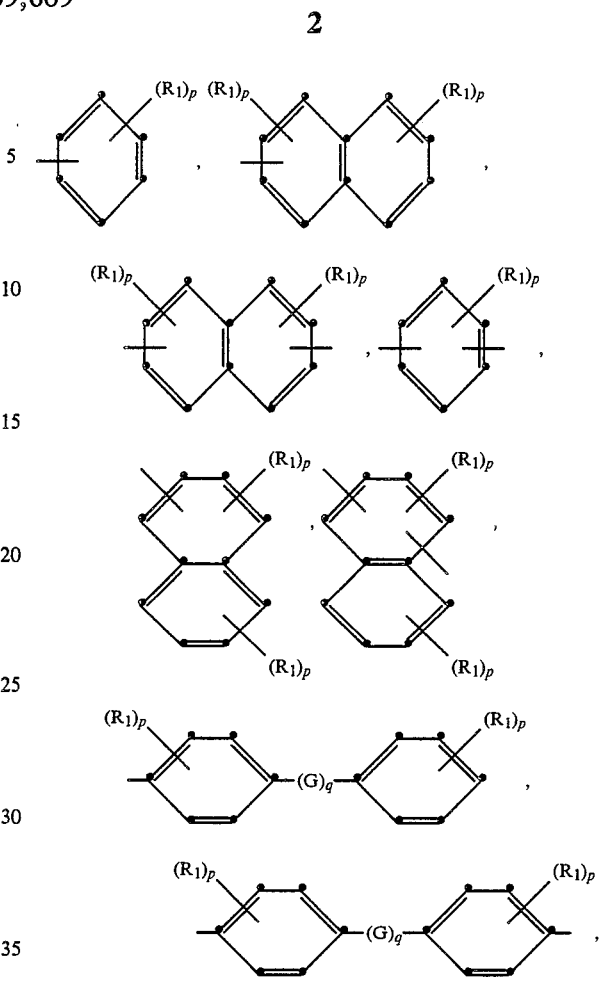

in which $R_1$ is hydrogen or alkyl, alkoxy, alkylthio, alkylamino or dialkylamino, it being possible for the stated radicals to contain 1 to 4 carbon atoms each, or amino, aryl, for example phenyl, halogen, in particular fluorine, chlorine or bromine, nitro, cyano, hydroxyl, mercapto, acylamido ($C_{1-4}$—alkyl—CONH—), sulfo, amidosulfonyl ($H_2N$—$SO_2$—, ($C_{1-4}$)alkyl$_2$N—$SO_2$—), carboxyl or amidocarbonyl ($H_2N$—CO—, ($C_{1-4}$—alkyl)$_2$N—CO—). G is a straight-chain or branched or heterocyclic, organic divalent radical, a hetero atom, for example —O— or —S—, or a group of the formula

—$SO_2$—, —NH—, —N=N— or —N=N—.
O

Suitable heterocyclic divalent organic radicals are preferably 5- or 6-membered unsaturated radicals in which the hetero atoms are nitrogen, oxygen and/or sulfur atoms, for example pyrrolediyl, furandiyl, thiophenediyl, thiophenedioxidediyl, imidazolediyl, thiazolediyl, oxazolediyl, oxadiazolediyl, thiadiazolediyl and triazolediyl, and also pyridinediyl, pyrazinediyl, pyrandily, triazinediyl, thiopyrandiyl and oxazinediyl.

Examples of straight-chain or branched organic radicals G are alkylene, for example methylene, ethylene, n-propylene, sec.-propylene or isopropylene

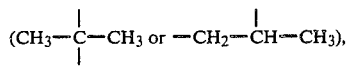

alkenylene, preferably ethenylene or butadienylene, and also —O—, —S—, —SO$_2$—, —CH$_2$SO$_2$—, —NH—, —N—alkyl having preferably 1 to 4 carbon atoms, —CH$_2$NH—, —NHCO—, —NHSO$_2$—, —NH-CONH— —NHCSNH—, —N=N— or

q can be 0 or 1.

The stated cyclic radicals E, E', D and D' can contain 1 to 3 substituents R$_1$. If 2 or 3 substituents R$_1$ are present, these can be identical or different from one another.

The bridge members L and L' can be identical or different from each other. They are preferably radicals such as alkylene having 1 to 4 carbon atoms, arylene such as phenylene and naphthylene, acylamide (—CONH—), carboxylene (—COO—), —O—, —S—, —NH—, —SO$_2$— or —N=N—.

The radicals B and B', which are identical (except that B and B' are not both 2,4-dihydroxyphenyl) or different from each other, are aromatic organic radicals, at least one of the radicals B and B' having very marked UV-absorbent properties. B and B' can be for example phenyl, naphthyl or one of the aromatic 5- or 6-membered heterocyclic structures mentioned for G, or a derivative of benzophenone, benzothiazole, benzotriazole, quinoxaline, triazine, phenyl salicylate, 2,4-dihydroxyphenyl or pyrone, which are all considered suitable for use as radical B or B', having very high absorption in the ultraviolet spectrum. The aromatic organic radicals B and B' can contain the substituents customary in dye chemistry. Suitable substituents are the radicals enumerated in the definition of R$_1$.

Preferred compounds of the formula (1) are those in which A is a radical of the formula

—E—N=N—D—N=N—E',

—E—N=N—D—N=N—E'—,

—E—N=N—D—N=N—D'—N=N—E' or

—E—N=N—D—N=N—D'—N=N—E'— which E, E', D and D', independently of one another, are a radical of the formula

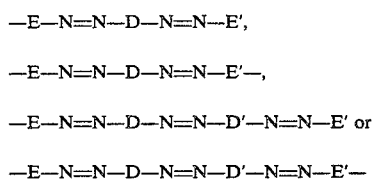

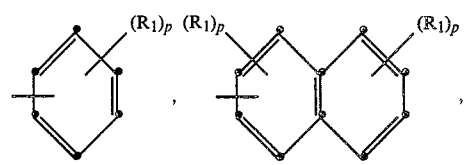

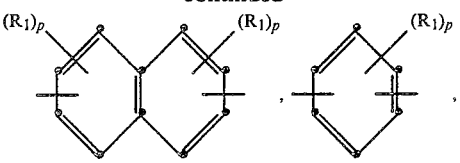

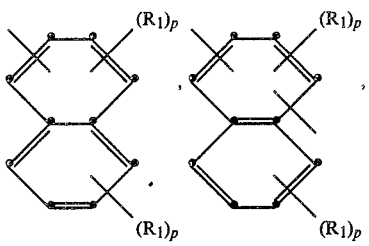

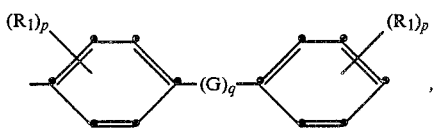

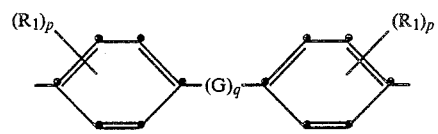

in which R$_1$ is hydrogen, alkyl, alkoxy, alkylthio, alkylamino, dialkylamino, amino, aryl, halogen, nitro, cyano, hydroxyl, mercapto, acylamido, sulfo, amidosulfonyl, carboxyl or amidocarbonyl, p is 0, 1, 2 or 3, G is a straight-chain or branched or heterocyclic organic radical or —O—, —S—, —SO$_2$—, —NH—, —N=N— or

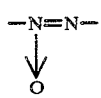

and q is 0 or 1.

Preferably in these compounds R$_1$ is alkyl, alkoxy, alkylthio, alkylamino or dialkylamino each having 1 to 4 carbon atoms, phenyl, amino, chlorine, nitro, cyano, hydroxyl, mercapto, acylamido, sulfo, amidosulfonyl, carboxyl or amidocarbonyl, or in particular alkoxy having 1 to 4 carbon atoms, amino, hydroxyl or sulfo.

In particularly suitable compounds, G is alkylene, alkenylene, alkylsulfonylene or alkylimino each having 1 to 4 carbon atoms, —NHCO—, —NHSO$_2$—, —NH-CONH—, —NHCSNH—, —O—, —S—, —SO$_2$—, —NH—, —N=N— or

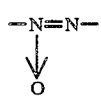

or preferably alkylene or alkylimino each having 1 to 4 carbon atoms, —NH—or —N=N—.

In a further group of preferred compounds, G is a radical of the formula

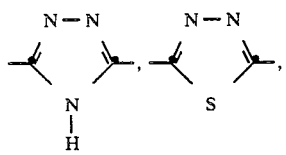 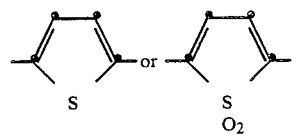

The chromophore A has, in particularly preferred compounds, the formula

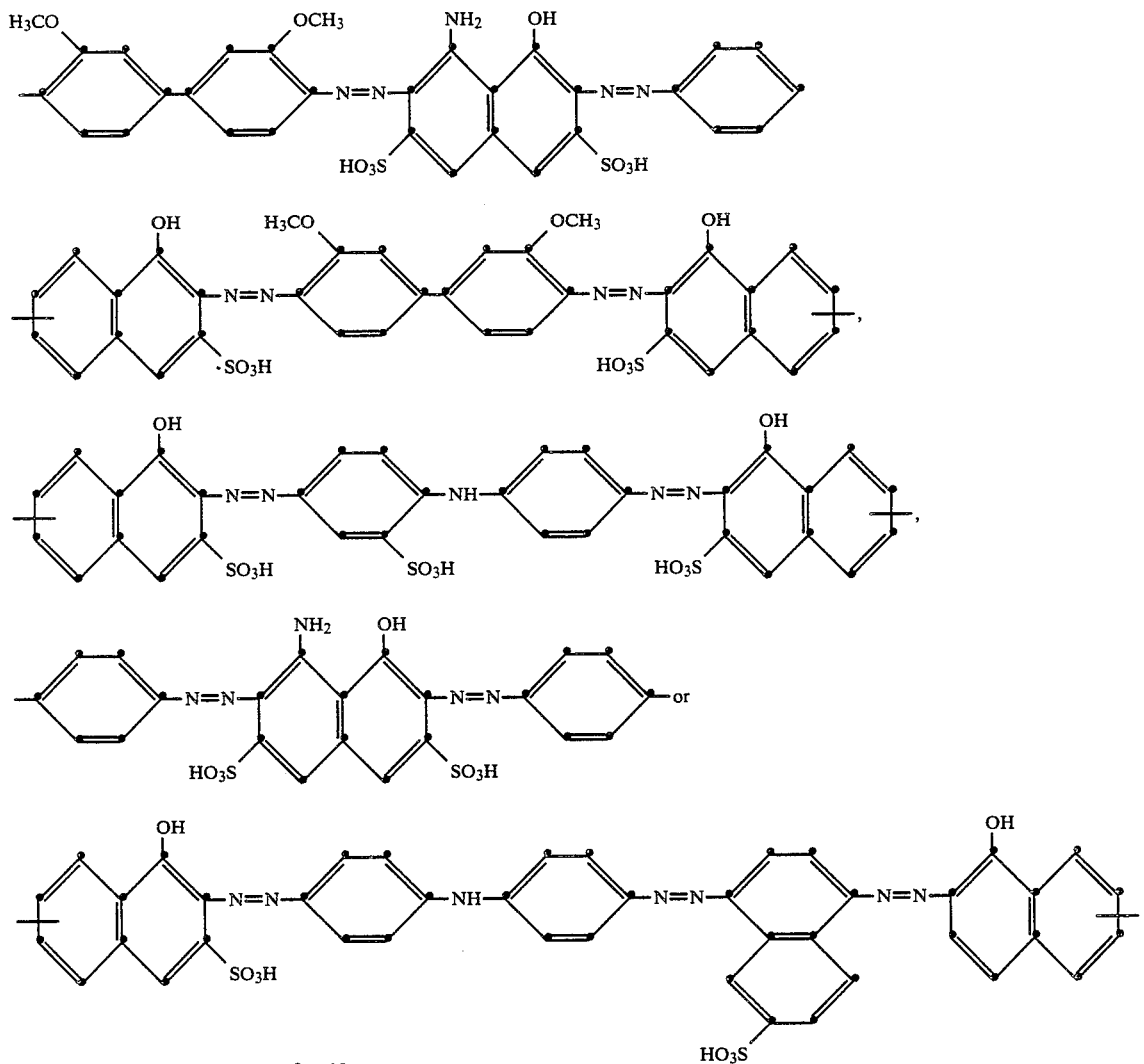

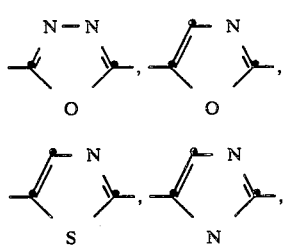

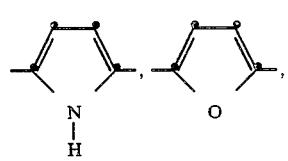

In suitable compounds of the formula (1), L and L', independently of each other, are alkylene having 1 to 4 carbon atoms, phenylene, naphthylene, —O—, —S—, —NH—, —SO$_2$—, —N=N—, —CO—NH— or

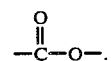

Preferred compounds of the formula (1) have radicals B and B' which, independently of each other, are phenyl, naphthyl, pyridinyl, pyrazinyl, thiophenyl, furanyl, pyrrolyl, thiazolyl, benzophenyl, benzothiazolyl, benzotriazolyl, triazinyl, quinoxalinyl, phenylsalicyl, resorcinyl or pyronyl, in particular independently of each other, benzophenyl, benzotriazolyl, benzothiazolyl, quinoxalinyl or 2,4-dihydroxyphenyl. 2,4-Dihydroxyphenyl is a particularly preferred radical B or B'.

Particular preference is given to those compounds in which B and B', independently of each other, are a radical of the formula

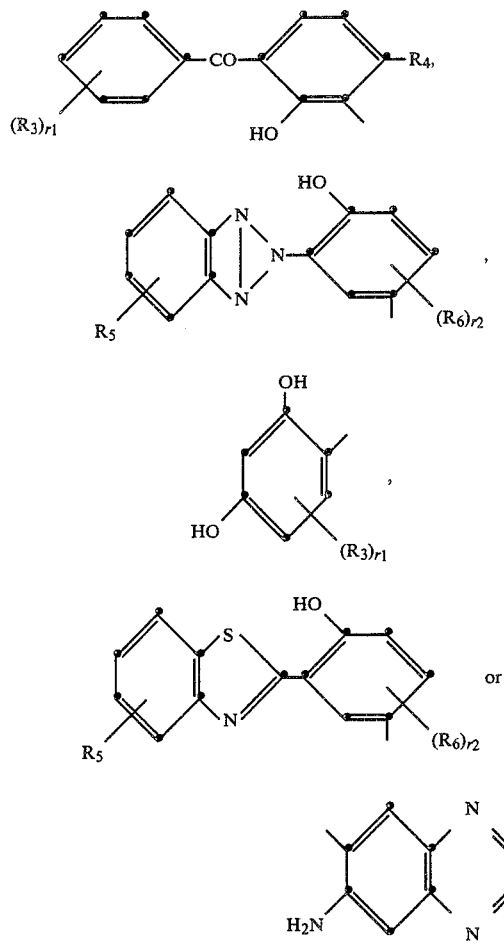

in which $R_3$ is hydrogen, hydroxyl, methoxy, chlorine, fluorine, carboxyl, or sulfo, $r_1$ is 1, 2 or 3, $R_4$ is hydroxyl, amino or alkoxy, sulfoalkyloxy or acylamino each having 1 to 4 carbon atoms, $R_5$ is hydrogen, chlorine or sulfo, $R_6$ is hydrogen, alkyl having 1 to 4 carbon atoms, carboxyalkyl having 1 to 4 carbon atoms or amino, and $r_2$ is 1 or 2 and especially, independently of each other, a radical of the formula

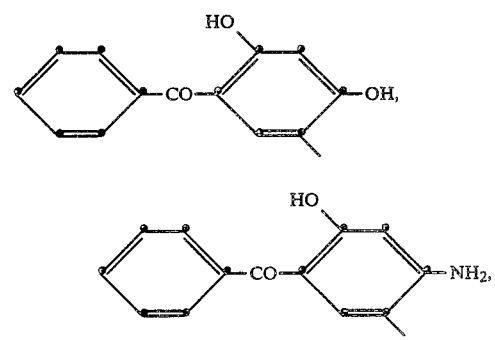

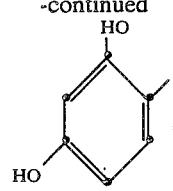

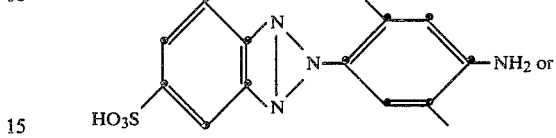

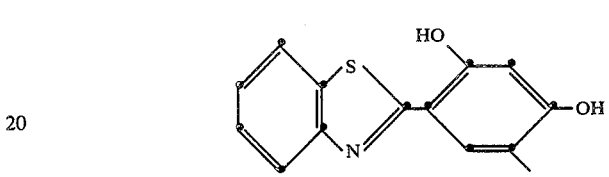

The compounds according to the invention absorb not only in large portions of the visible spectrum but also to a high degree in the ultraviolet region. The molar extinction coefficients of these compounds at wavelengths below 400 nm are distinctly higher than those of corresponding compounds without UV-absorbent groups. Furthermore, the compounds according to the invention all have a dark colour, for example dark brown, dark blue, dark green or black. The black compounds can for example also be used for preparing black and white images from silver dye bleach material. All compounds of the formula (1) are readily bleached under the conditions customary for the processing of exposed silver dye bleach materials.

The novel compounds of the formula (1) are prepared by customary methods. If L and L' are azo groups, the compound of the formula

(6)

is turned into the corresponding tetrazo compound, A, m and n being defined as above. This compound is then converted by coupling with the compound of the formula B—H or     (7a) B'—H

in which B and B' are as defined above, into the corresponding compound of the formula

 (1a)

If L and L' are as defined above save azo groups, it is advantageous to proceed from the compound of the formula

 (8)

and react this compound with the compound of the formula

B—L—halogen or     (9)
B'—L'—halogen

to give the compound of the formula $$(B\text{---}L)_mA\text{---}L'\text{---}B')_n \quad (1b)$$

The incorporation of the compounds according to the invention and also of those compounds of the formula (1) in which the radicals B and B' are both 2,4-dihydroxyphenyl groups in photographic silver dye bleach materials is carried out as follows:

The stated compounds, preferably as solution in water or in a water-miscible solvent, are added with stirring at room temperature or elevated temperature to an aqueous gelatin solution. Subsequently this mixture is brought together with a binder containing silver halide and/or other materials for producing photographic images, and the resulting mixture is cast in conventional manner on a substrate to form a layer which can, if desired, be dried.

The solution of these compounds can also be added directly to a binder containing silver halide and/or other materials for producing photographic images. It is possible, for instance, to meter in the solution only immediately before casting. Instead of simply stirring, it is also possible to use the customary methods of dispersion which rely on kneading and/or shearing forces or ultrasound. It is also possible to add the compounds according to the invention not as solution but in solid form or as paste.

Suitable silver halide emulsions can contain silver bromide or silver iodobromide but also silver chloride or silver chlorobromide or silver chloroiodobromide. The silver halide emulsions can be spectrally sensitised and contain stabilisers and anti-fogging agents. Such silver halide emulsions are described for example in Research Disclosure No.17, 643 (December 1978), No.18, 155 (May 1979) and No.22, 534 (January 1983). The choice of a specific emulsion is determined especially by the sensitivity required for the material.

The gelatin used in the photographic material according to the invention as a binder for the compounds of the formula (1) used as image dye, for silver halide and, if present, filter dyes can contain additives, for example polyvinyl alcohol or polyvinylpyrrolidone. Furthermore, a portion of the gelatin can be replaced by dispersions of waterinsoluble, high-molecular substances, for example dispersion polymers of $\alpha,\beta$-unsaturated compounds such as acrylate esters, vinyl esters and vinyl ethers, vinyl chloride and also vinylidene chloride. The gelatins are preferably crosslinked by means of the triazine derivatives described in CH-A-574,980. However, it is also possible to use other curing agents, for example aldehydes, vinyl sulfones, diimines and the like.

The substrate for the material used according to the invention can be a customary transparent material, for example a material made of cellulose triacetate or polyester.

Preferably the material according to the invention contains a transparent substrate, a silver halide emulsion layer containing a compound of the formula (1), and if desired a protective layer. In addition, the material according to the invention can also have a layer containing a bleachable image dye.

The processing of the exposed silver dye bleach materials is generally carried out in four successive steps: silver development, dye bleach, silver bleach and fixing.

The first step consists of the development of the latent silver image formed in the course of exposure. The second step consists in bleaching out the image dye which is associated with the silver in correspondence with the present imagewise distribution of the silver. The third step is necessary to reoxidise the excess image silver which is still present after the dye bleach. In the fourth step, the silver, all of which is then present in the form of halides, is removed by dissolving out with a complexing agent, in particular with a salt of thiosulfuric acid, in order to render the completed image insensitive to further exposure and to free the pure dye image of clouding.

The second process step, namely the dye bleach, takes place in the customary known processes in a strongly acid medium and in the presence of a catalyst for speeding up the dye bleach. The bleach baths additionally contain a silvercomplexing agent or ligand. Both components, that is to say catalyst and ligand, are necessary in order to transmit the reducing action of the metallic, non-diffusible image silver to the similarly non-diffusible dye. The reduced form of the catalyst formed by reduction at the image silver in this step serves as an intercarrier which, after covering a certain diffusion length, irreversibly reduces and hence bleaches the dye and thereby is itself reoxidised to the original form.

The ability of the reduced form of the bleach catalyst to diffuse freely between image silver and dye to be bleached makes it possible to keep silver and image dye spatially separate from each other to a certain degree; that is, to arrange the bleachable dye and the associated silver halide emulsion to be not or only partially in the same layer but in adjacent layers. Such silver dye bleach materials are described for example in DE-A-2,036,918, DE-A-2,132,835 and DE-A-2,132,836.

A simplified form of the process, wherein the dye bleach and the silver bleach are combined in a single process step, is described in DE-A-2,488,433.

The combined dye and silver bleach baths (preparations) for processing the exposed silver dye bleach material contain components (a) to (e) and can, if desired, also contain (f): (a) strong acid, (b) water-soluble iodide, (c) water-soluble oxidising agent, (d) oxidation inhibitor, (e) bleach catalyst, (f) bleach accelerant.

The amount of bleach catalysts which is used in the preferably aqueous treatment baths can vary within wide limits and is about 0.05 to 10 g/l of bleach bath.

The temperature of the bleach bath is generally between 20° and 90° C., preferably between 20° and 60° C., the necessary duration of treatment at a relatively high temperature being of course shorter than at a relatively low temperature. The bleach baths are stable within the specified temperature ranges. The aqueous bleach preparations required for processing are generally used in the form of dilute aqueous solutions which contain the stated components. However, there are other possible methods, for example the use in paste form.

This temperature range also applies to the other processing steps. The aqueous bleach preparation according to the present invention can be prepared for example from liquid, in particular aqueous, concentrates of individual or all components (a) to (f). Advantageously use is made of, for example, two liquid concentrates, one of which contains the strong acid (a) and the oxidising agent (c) and the other of which contains the other components (b), (d), (e) and if desired (f), this latter concentrate also containing an additional solvent for improving the solubility, in particular of component (e), such as ethyl or propyl alcohol, benzyl alcohol, or ethylene glycol methyl or ethyl ether. The aqueous bleach preparations which are used generally contain the components (a) to (f) in the following amounts: (a) strong acid: 10 to 220 g/l; (b) water-soluble iodide: 2 to 50 g/l; preferably 5 to 25 g/l; (c) water-soluble oxidising agent: 1 to 30 g/l; (d) oxidation inhibitor: 0.5 to 10 g/l; (e) bleach catalyst: 0.05 to 10 g/l; and if desired (f) bleach accelerant: 1 to 20 g/l.

The strong acids (component (a)) in the combined dye and silver bleach baths can be alkylsulfonic or arylsulfonic acids and in particular p-toluenesulfonic acid, sulfuric acid, sulfamic acid or trichloroacetic acid. If desired it is also possible to use mixtures of these acids. The pH of the bleach bath is in particular not higher than 2 and preferably not higher than 1.

The water-soluble iodides (component (b)) are generally alkali metal iodides, in particular sodium iodide or potassium iodide.

The oxidising agents (c) used are advantageously water-soluble aromatic mononitro or dinitro compounds or anthraquinonesulfonic acid derivatives. The use of such oxidising agents serves to influence the dye equilibrium and the contrast of the images prepared in the dye bleach process and is known from German Pat. No. 735,672, British Pat. Nos. 539,190 and 539,509 and Japanese Patent Publication No. 22673/69.

The mononitro and dinitro compounds are preferably mononitrobenzenesulfonic and dinitrobenzenesulfonic acids, o-nitrobenzenesulfonic acid, m-nitrobenzenesulfonic acid, 2,4-dinitrobenzenesulfonic acid, 3,5-dinitrobenzenesulfonic acid, 3-nitro-4-chlorobenzenesulfonic acid, 2-chloro-5-nitrobenzenesulfonic acid, 4-methyl-3,5-dinitrobenzenesulfonic acid, 3-chloro-2,5-dinitrobenzenesulfonic acid, 2-amino-4-nitrobenzenesulfonic acid, 2-amino-4-nitro-5-methoxybenzenesulfonic acid and 4-nitrophenol-2-sulfonic acid.

The compounds of component (c) serve not only as silver bleach agents but also for flattening gradations.

The oxidation inhibitors (corrosion inhibitors) (d) used are advantageously reductones or water-soluble mercapto compounds. Suitable reductones are in particular acireductones having a 3-carbonyl-1,2-diol grouping, such as reductone, triosereductone or preferably ascorbic acid. Suitable mercapto compounds are for example thioglycerol, but in particular the compounds of the formulae HS—$C_qH_{2q}$—B or preferably HS—$(CH_2)_m$—COOH, in which q is an integer from 2 to 12, B is a sulfo or carboxyl group and m is one of the numbers 3 and 4. Mercapto compounds which can be used as oxidation inhibitors are described in DE-A-2,258,076 and DE-A-2,423,814. Further suitable oxidation inhibitors are alkali metal, alkaline earth metal and ammonium bisulfite adducts of organic carbonyl compounds, preferably alkali metal or ammonium bisulfite adducts of monoaldehydes having 1 to 4 or dialdehydes having 2 to 5 carbon atoms (DE-A-2,737,142).

Examples are the particularly preferred formaldehyde bisulfite adduct and also the corresponding adducts of acetaldehyde, propionaldehyde, butyraldehyde or isobutyraldehyde, of glyoxal, malondialdehyde or glutardialdehyde. If desired, the tertiary water-soluble phosphines given below as bleach accelerants can also be used at the same time as oxidation inhibitors.

Examples of suitable bleach accelerants (f) are quaternary ammonium salts of the type known from DE-A-2,139,401 and 2,716,136. These salts are preferably quaternary, substituted or unsubstituted piperidine, piperazine, pyrazine, quinoline or pyridine compounds, the latter being preferred. It is also possible to use tetraalkylammonium compounds (alkyl having 1 to 4 carbon atoms) and alkylenediammonium compounds (alkylene having 2 to 6 carbon atoms). Specific examples are: tetraethylammonium iodide; $(CH_3)_3N^\oplus(CH_2)_2N^\oplus(CH_3)_3.2I^\ominus$; $(CH_3)_3N^\oplus(CH_2)_6N^\oplus(CH_3)_3.2I^\ominus$; N-methylpyridinium iodine; N-methylquinolinium iodide; N-hydroxyethylpyridinium chloride; N-hydroxypropylpyridinium bromide; N-methyl-2-hydroxymethylpyridinium iodide; N,N-dimethylpiperidinium iodide; N,N'-dimethylpyrazinium fluorosulfate; and γ-picolinium hydrogensulfate.

Further bleach accelerants are the water-soluble tertiary phosphines which are known from DE-A-2,651,969 and which preferably contain at least one cyanoethyl group, for example bis-(β-cyanoethyl)-2-sulfoethylphosphine (sodium salt), bis-(β-cyanoethyl)-3-sulfopropylphosphine (sodium salt), bis-(β-cyanoethyl)-4-sulfobutylphosphine (sodium salt), bis-(β-cyanoethyl)-2-methoxyethylphosphine, bis-(2-methoxyethyl)-(β-cyanoethyl)-phosphine, (β-cyanoethyl)-phenyl-3-sulfopropylphosphine (sodium salt), (β-cyanoethyl)-phenyl-2-methoxyethylphosphine and bis-(2-methoxyethyl)-phenylphosphine.

To develop the silver it is possible to use baths of customary composition, for example those which contain, as developer substance, hydroquinone and can, if desired, also contain 1-phenyl-3-pyrazolidinone. If desired, the silver development bath already contains a bleach catalyst.

The silver-fixing bath can be composed in known and conventional manner. The fixing agent used can be for example sodium thiosulfate or, advantageously, ammonium thiosulfate, if desired together with additives such as sodium bisulfite and/or sodium metabisulfite.

The images prepared from the material according to the invention are distinguished by good reproduction and legibility of the depicted details. The image dyes also have the required high absorption in the ultraviolet spectrum. These properties make it possible to use the images as originals for preparing, for example, copies by the diazotype method. For example, the images prepared with the material according to the invention can be present in the form of microfiches. The information contained thereon can then be magnified and copied on to diazotype material. Examples of suitable diazotype materials are described in German Pat. No. 1,285,874 and German Pat. No. 2,166,264.

The material according to the invention can however also be used for preparing high-quality black and white images.

PREPARATION EXAMPLES

Example 1

Dye of the formula

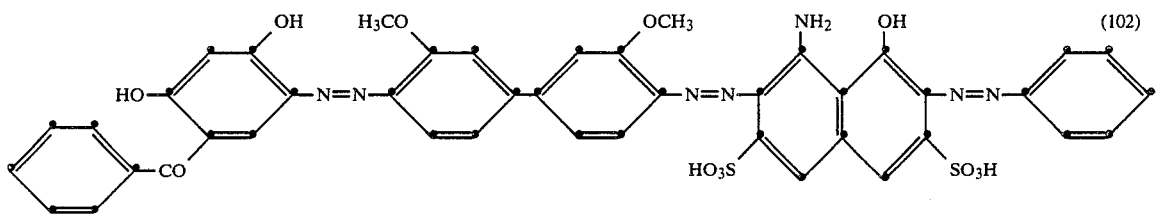

A mixture of 12.2 g (0.05 m) of o-dianisidine in 50 ml of water and 11.5 ml of concentrated hydrochloric acid (39%) is heated at 80° C. and is then cooled down, and a further 11.5 ml of hydrochloric acid (39%) are added. The solution is tetrazotised with 8.0 g (0.115 m) of sodium nitrite while cooling with ice and, after destruction of the excess nitrite with sulfamic acid, is coupled on to 22.0 g of H acid (72.7%) (0.05 m) under acid conditions. 4.4 g (0.047 m) of aniline are then diazotised and added to the intermediate. Coupling is effected by raising the pH to 9 by means of sodium carbonate. After 1 hour the pH is raised to 10 by means of sodium carbonate and an aqueous solution of 11.8 g (0.005 m) of 2,4-dihydroxybenzophenone, adjusted to pH 10 with aqueous sodium hydroxide solution, is added dropwise. After 1 hour at 10° C. the reaction mixture is heated to 50° C. and cooled down again. On acidifying with hydrochloric acid to pH 1 the dye of the formula (102) precipitates. It is purified by repeated suspension in warm pyridine and ethanol. This gives 12.6 g of dye (55.7% yield).

Example 2

Dye of the formula

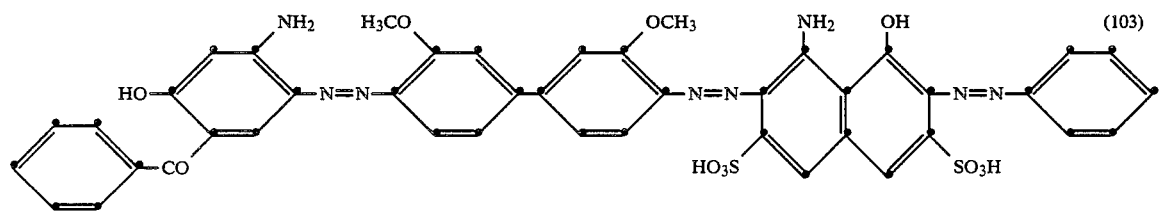

Example 1 is repeated, except that dihydroxybenzophenone is replaced by an equivalent amount of 4-amino-2-hydroxybenzophenone which is coupled on to the diazo intermediate at pH 8.2, affording 6.9 g of the trisazo dye of the formula (103) (30.5% yield).

Example 3

Dye of the formula

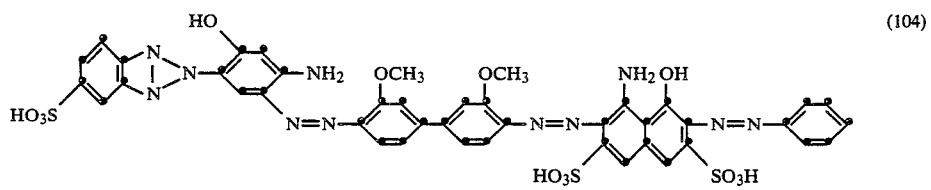

Example 1 is repeated, except that dihydroxybenzophenone is replaced by an equivalent amount of 2-(4-amino-2-hydroxy)-phenylbenzotriazole-5-sulfonic acid which is coupled on to the diazo intermediate at pH 8.2, affording 17.9 g of the dye of the formula (104) (7.8% yield).

Example 4

Dye of the formula

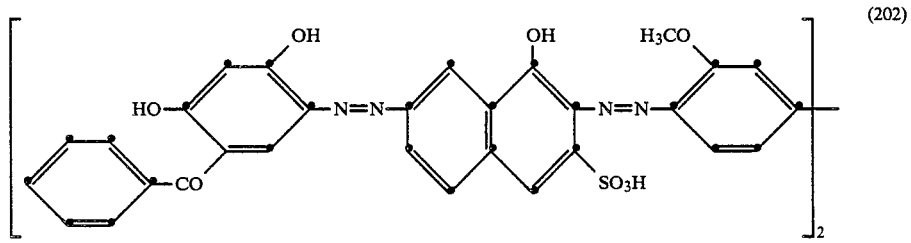

12.2 g (0.05 m) of o-dianisidine are tetrazotised as in Example 1. The tetrazo solution is added dropwise at 10° C. to a coupling solution of 33.6 g (0.10 m) of gamma acid (71.2%) and 4 g of sodium hydroxide in 350 ml of water, while the pH is maintained between 8 and 9. After stirring overnight, the reaction mixture is heated to 60° C. and cooled down again. The intermediate isolated by filtration is purified by repeated suspension in warm ethanol. 7.9 g (0.01 m) of intermediate (calculated as 100% pure) is tetrazotised in aqueous hydrochloric acid solution (pH 2) with 1.5 g (0.022 m) of sodium nitrite. After destruction of the excess nitrite by means of sulfamic acid, the tetrazo solution is coupled on to 5.1 g (0.024 m) of 2,4-dihydroxybenzophenone, which has been dissolved in 80 ml of water and brought to pH 10 with aqueous sodium hydroxide solution, while pH 10 is maintained by means of sodium carbonate. The reaction mixture is stirred at 10° C. for 4 hours, is then heated to 40° C., is cooled down again and is filtered. The isolated crude product is purified as in Example 1. This gives 8.7 g of dye of the formula (202) (70.2% yield).

Example 5

Dye of the formula

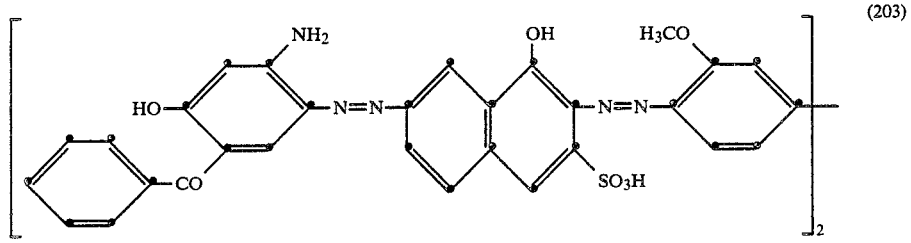
(203)

Example 4 is repeated, except that dihydroxybenzophenone is replaced by an equivalent amount of 4-amino-2-hydroxybenzophenone and coupling is carried out at pH 8.5, affording 9.0 g of the tetrakisazo dye of the formula (203) (73.1% yield).

Example 6

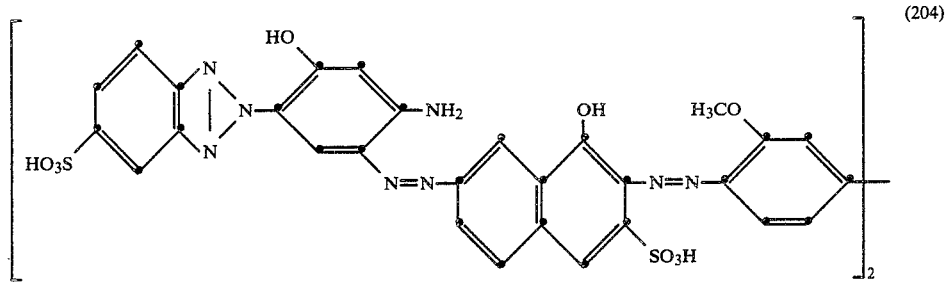
(204)

Example 4 is repeated, except that dihydroxybenzophenone is replaced by 2-(4-amino-2-hydroxy)-phenylbenzotriazole-5-sulfonic acid and coupling is carried out at pH 8.5, affording 10.7 g of the tetrakisazo dye of the formula (204) (73.2% yield).

Example 7

Dye of the formula hour the excess nitrite is destroyed with sulfamic acid. 215 g (0.9 m) of gamma acid are dissolved at pH 7 in 720 ml of water by addition of aqueous sodium hydroxide solution. After addition of 1,200 ml of 14% sodium carbonate solution, the tetrazo solution is added dropwise at a temperature of at most 10° C. in the course of 30 minutes. The resulting suspension is stirred for 2 hours and is then heated to 20° C. and finally to 40° to 50° C. The suspension is filtered at 20° C., and the moist crude product is suspended twice in 400 ml of hot ethanol.

33.8 g (0.4) of this intermediate suspended in 1,100 ml of water and acidified with 9.5 ml of concentrated sulfuric acid (93%) are tetrazotised at 0° to 5° C. by means of 6.1 g (0.088 m) of sodium nitrite. After 4 hours at 0° to 5° C. the excess nitrite is destroyed with sulfamic acid. 20.6 g (0.096 m) of 2,4-dihydroxybenzophenone are dissolved in 320 ml of water by heating in the presence of 10 ml of aqueous sodium hydroxide solution (10 m) and 80 ml of sodium carbonate solution (14%). The coupling is carried out at a temperature of at most 10° C. by dropwise addition of the tetrazo solution and while the pH is maintained at 10 by means of sodium carbonate. After 4 hours of reaction at 10° C., the reaction mixture is heated to 30° C. until everything has gone into solution. The dye is precipitated by acidifying with sulfuric acid to pH 1 and filtered off. The moist crude product is purified by suspension in hot methanol

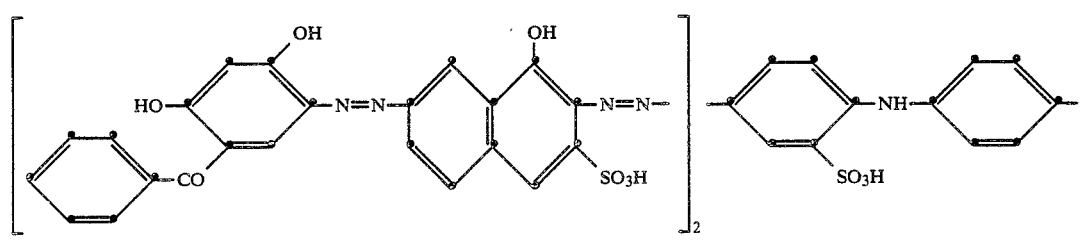
(206)

11.2 g (0.4 m) of 4,4'-di-(aminophenyl)-amine-2-sulfonic acid are suspended in 1,500 ml of water. After acidification with 140 ml of hydrochloric acid, the suspension is tetrazotised at 0° C. with 57 g (0.83 m) of sodium nitrite dissolved in 75 ml of water. After one and subsequently in sulfuric acid (1 N). This gives 9.8 g of dye of the formula (206) (39.2% yield).

Example 8

Dye of the formula

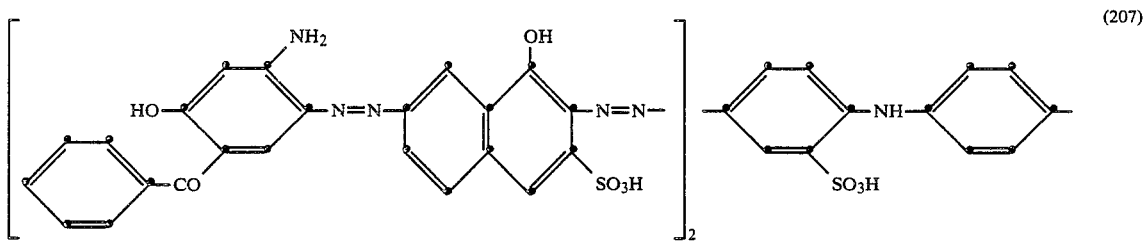
(207)

The tetrazotised intermediate of Example 7 is coupled at pH 5.5, buffered with sodium acetate, on to an equivalent amount of 4-amino-2-hydroxybenzophenone in place of 2,4-dihydroxybenzophenone. The dye is purified by suspension in pyridine and ethanol as in Example 1. This gives 10.9 g of dye of the formula (207) (42.0% yield).

Example 9

Dye of the formula

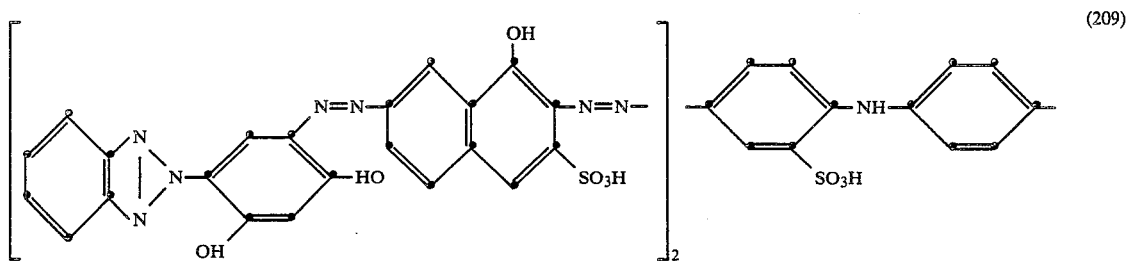
(208)

Coupling the tetrazotised intermediate of Example 7 at pH 10 on to an equivalent amount of 2-(4-amino-2-hydroxy)phenylbenzotriazole-5-sulfonic acid in place of 2,4-dihydroxybenzophenone and purifying the crude dye as in Example 1 gives the tetrakisazo dye of the formula (208) in 79.4% yield (14.2 g).

Example 10

Dye of the formula

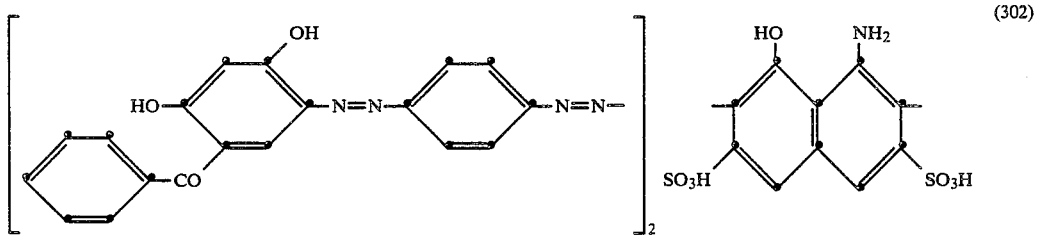
(209)

Coupling the tetrazotised intermediate of Example 7 on to an equivalent amount of 2-(2,4-dihydroxyphenyl)-benzotriazole, dissolved in acetone, in place of 2,4-dihydroxybenzophenone and purifying the crude product as in Example 1 gives the tetrakisazo dye of the formula (209) in 78.2% yield (13.1 g).

Example 11

Dye of the formula

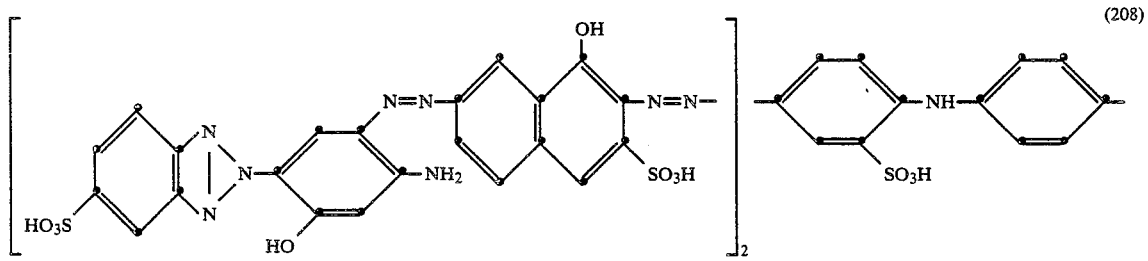
(302)

11.2 g (0.020 m) of the disazo dye

Example 12

Dye of the formula

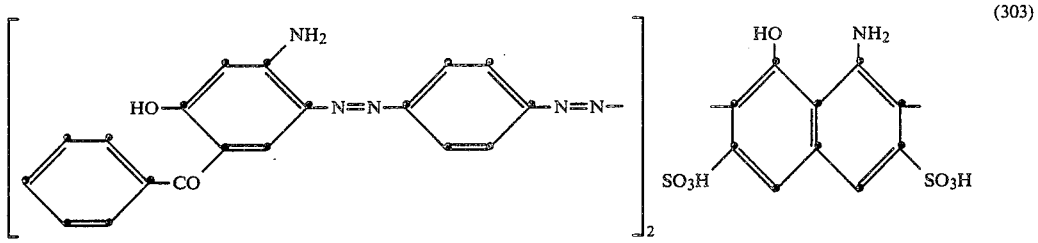

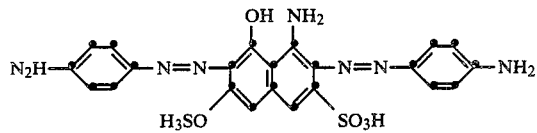

are tetrazotised in hydrochloric acid solution with 3.0 g (0.044 m) of sodium nitrite, the nitrite excess is destroyed with sulfamic acid, and the tetrazonium salt is coupled on to 9.4 g (0.044 m) of 2,4-dihydroxybenzophenone as in Example 1. The crude dye is purified as in Example 1. This gives 10.6 g of the dye of the formula (302) (50.4% yield).

The disazo dye of the formula (302a) is prepared in known manner by, first, coupling 1 mole of diazotised p-nitroaniline on to 1 mole of 1-amino-8-naphthol-3,6-disulfonic acid under acid conditions, then coupling on to the resulting monoazo dye a second mole of diazotised p-nitroaniline under alkaline conditions, and finally reducing the two nitro groups of the disazo dye with sodium sulfide to form amino groups.

11.2 g (0.020 m) of the disazo dye of the formula (302a) are tetrazotised and coupled on to 9.4 g (0.044 m) of 4-amino-2-hydroxybenzophenone at pH 8.5, both steps being carried out as in Example 11. This gives the dye of the formula (303) in a 21.2% yield (4.5 g).

Example 13

Dye of the formula

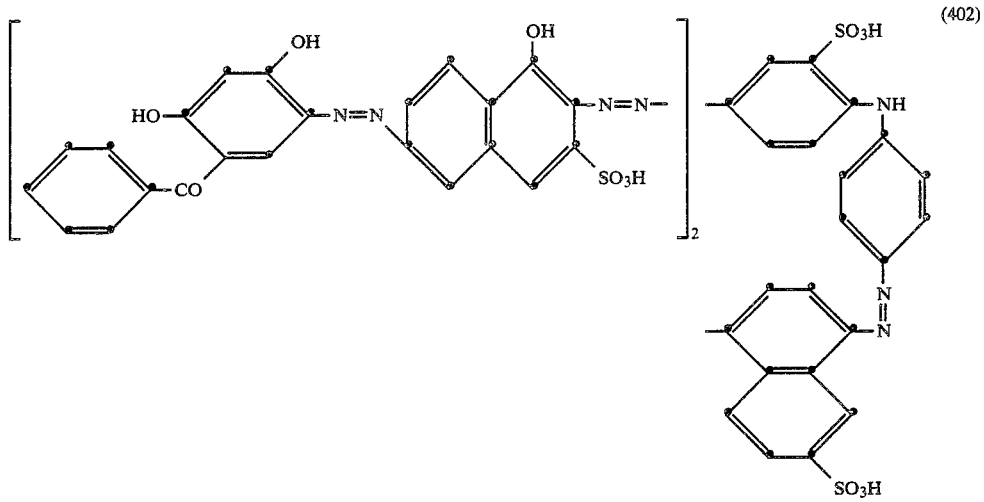

5.5 g (0.005 m) of the trisazo dye of the formula

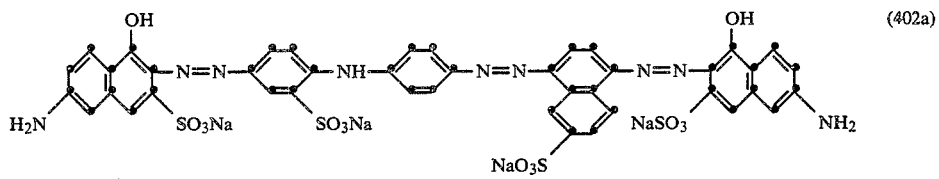

are tetrazotised in hydrochloric acid solution with 0.8 g (0.011 m) of sodium nitrite, the nitrite excess is destroyed with sulfamic acid, and the tetrazonium salt is coupled at pH 10 on to 2.6 g (0.012 m) of 2,4-dihydroxybenzophenone. This gives the pentakisazo dye of the formula (402) as a crude product, which is purified as described in Example 1. Yield 51.9% (4.0 g).

The preparation of the trisazo dye of the formula (402a) is described in DE-A-2,215,081.

Example 14

Dye of the formula

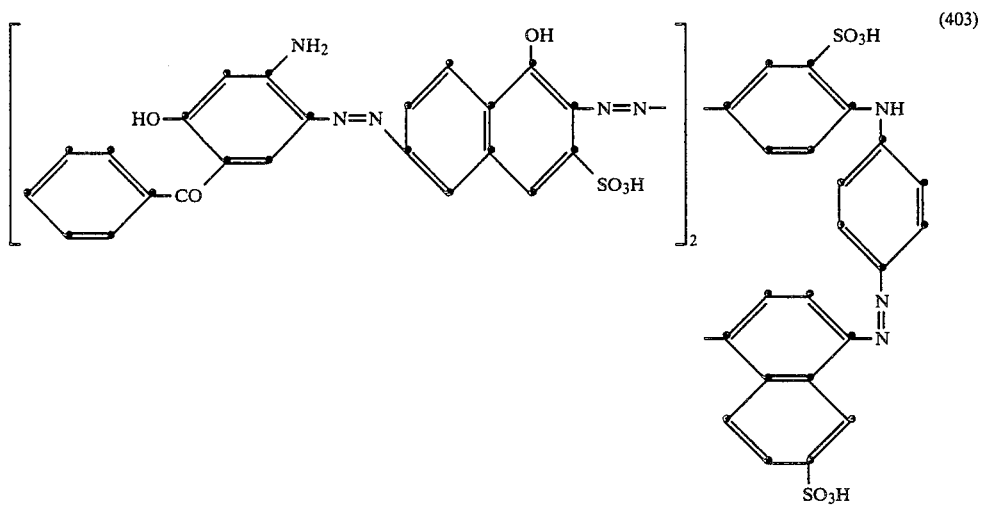

5.5 g (0.005 m) of the trisazo dye of the formula (402a) are tetrazotised as in Example 13 and coupled at pH 8.5 on to 2.6 g (0.012 m) of 4-amino-2-hydroxybenzophenone. This gives 7.5 g of the dye of the formula (403) (51.9% yield).

Example 15

Dye of the formula

Tetrazotisation of 5.5 g (0.005 m) of the trisazo dye of the formula (402a) and coupling of the tetrazonium salt at pH 8.5 on to 3.7 g (0.012 m) of 2-(4-amino-2-hydroxy)phenylbenzotriazole-5-sulfonic acid gives 4.0 g of the pentakisazo dye of the formula (404) (44.9% yield).

Example 16

Dye of the formula

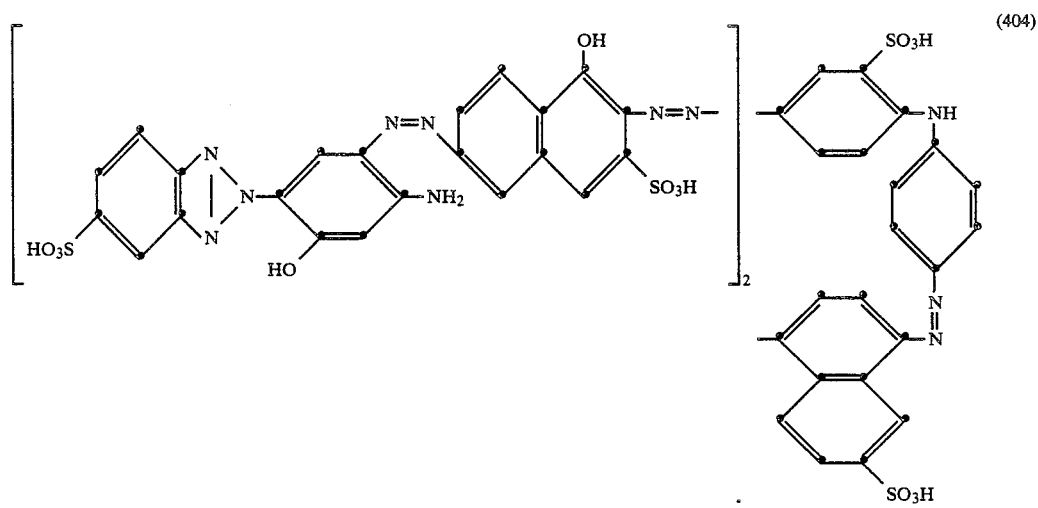

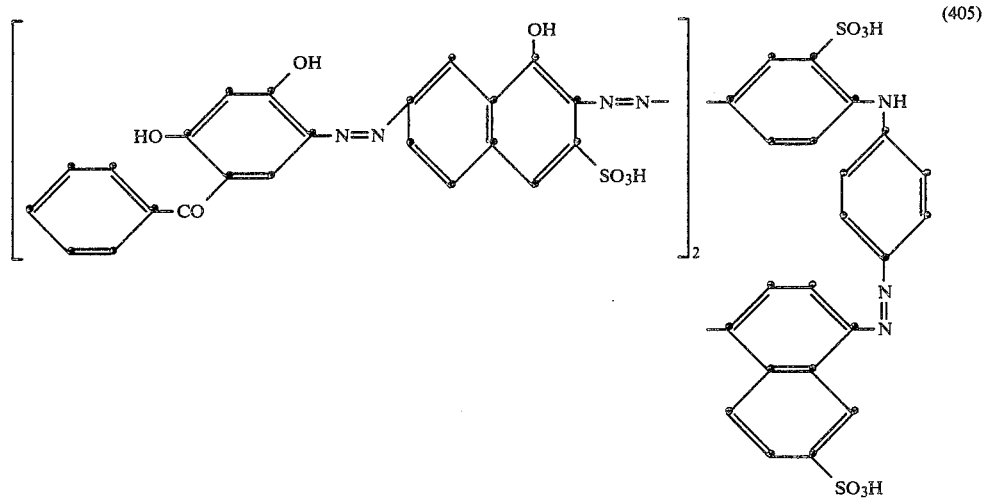

Example 13 is repeated, except that the trisazo dye of the formula (402a) is replaced by the isomeric starting material of the formula Example 14 is repeated except that the trisazo dye of the formula (402a) is replaced by that of the formula (402b). 5.9 g of the pentakisazo dye of the formula (406) are obtained (63.6% yield).

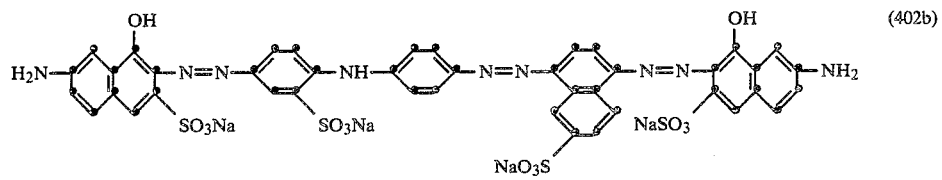

The pentakisazo dye of the formula (405) is obtained in 66.6% yield (8.1 g).

Example 17

Dye of the formula

Example 18

Dye of the formula

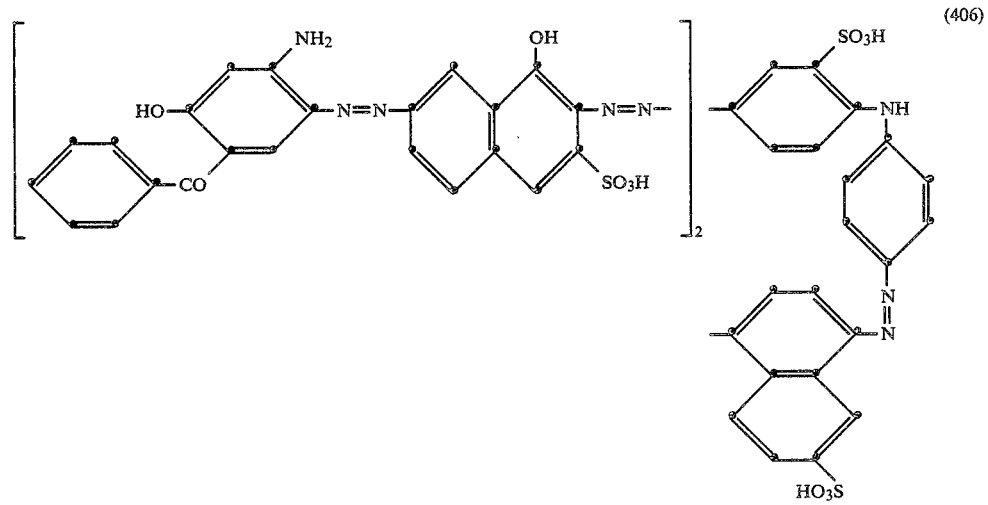

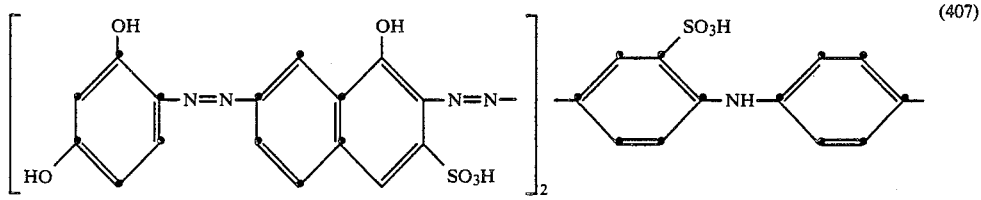

38 g (0.04 m) of the disazo dye of the formula

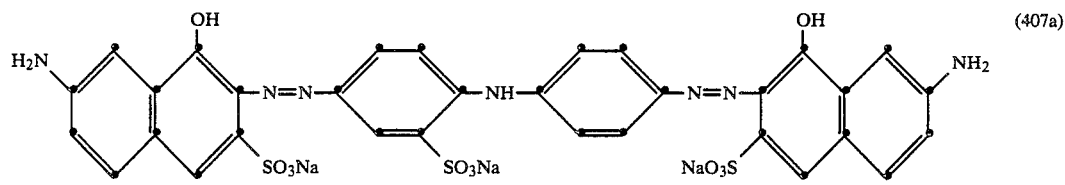

are suspended in 1,100 ml of water. The resulting suspension is heated to 50° C. and is cooled down again to room temperature. 6.1 g (0.088 m) of sodium nitrite dissolved in 30 ml of water are added. This is followed by cooling in ice down to 0° to 5° C. 30 ml (0.35 m) of concentrated hydrochloric acid are then added, and the suspension is stirred at 0° to 5° C. for 4 hours. The nitrite excess is then destroyed with sulfamic acid. The tetrazo suspension thus obtained is added in the course of 30 minutes to a cooled coupling agent solution at 0° C. which contains 9.7 g of resorcinol (0.088 m) and 31.8 g (0.30 m) of sodium carbonate in 100 ml of water. During the dropwise addition of the tetrazo suspension to the coupling solution the pH is maintained at 10 by the simultaneous addition of about 280 ml of sodium carbonate solution (14%). The reaction mixture is reacted at a temperature below 10° C. for 4 hours and is then allowed to warm up to room temperature. After heating the reaction mixture to 40° C. for 1 hour, the crude product (200 g) is isolated and suspended in 900 ml of water. The suspension is brought to pH 12 with aqueous sodium hydroxide solution (30%) and is then stirred at 70° C. until a solution forms. The solution is filtered, and the compound of the formula (407) is precipitated as crude product by addition of 30 ml of concentrated hydrochloric acid. This crude product is purified by boiling in ethanol for 30 minutes and drying at 70° C. in vacuo. This gives 32 g (71.2% yield) of the compound of the formula (407).

Table 1 below shows the position of the absorption maximum and the molar extinction coefficients of a solution of the dyes according to the invention prepared in Examples 1 to 17 in a mixture of dimethylformamide (DMF/H$_2$O(1:1)).

TABLE 1

| Dyes of the formula | $\lambda_{max}$ (nm) | $\xi_{mol}$ |
|---|---|---|
| 102 | 567 | 35 500 |

TABLE 1-continued

| Dyes of the formula | $\lambda_{max}$ (nm) | $\xi_{mol}$ |
|---|---|---|
| 103 | 574 | 37 600 |
| 104 | 575 | 41 800 |
| 202 | 618 | 69 200 |
| 203 | 609 | 81 400 |
| 204 | 615 | 81 100 |
| 206 | 609 | 61 100 |
| 207 | 583 | 58 100 |
| 208 | 610 | 60 600 |
| 209 | 582 | 67 000 |
| 302 | 652 | 67 100 |
| 303 | 623 | 26 800 |
| 402 | 587 | 49 000 |
| 403 | 585 | 52 000 |
| 404 | 595 | 65 400 |
| 405 | 612 | 63 800 |
| 406 | 611 | 58 200 |
| 407 | 610 | 56 300 |

USE EXAMPLES

Example 19

364 mg of the dye of the formula

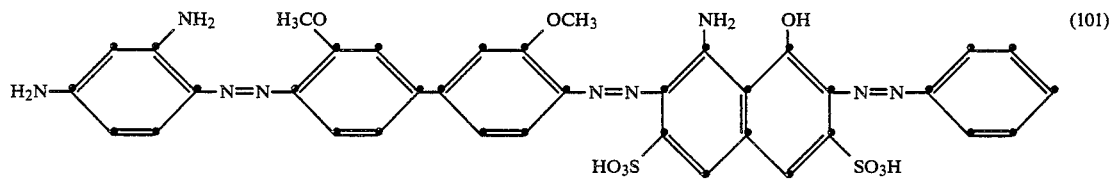

(comparative compound) are dissolved in 50 ml of water and added to a mixture of 38 ml of 3.7% aqueous gelatin solution, 1 ml of an 8% solution of the sodium salt of dibutylnaphthalenesulfonic acid and 11 g of a spectrally non-sensitised gelatin silver chloroiodobromide solution which contains about 140 g of silver and 70 g of gelatin per kilogram. This mixture is cast together with a protective layer consisting of 37.4 ml of 3.9% aqueous gelatin solution, 1 ml of a 6% solution of the sodium salt of the bis-2-ethylhexyl ester of sulfosuccinic acid, 1 ml of a 3% solution of a fatty acid alkanolamide and 0.6 ml of a 10% solution of formaldehyde on to 1 m$^2$ of a polyester substrate and dried.

Behind a step wedge, the light-sensitive material thus obtained is exposed through a blue filter with 10,000 lux/cm² for 1 second and is processed at 30° C. as follows:

| Developing | 1.5 minutes |
|---|---|
| Washing | 0.5 minute |
| Silver and dye bleach | 1.5 minutes |
| Washing | 0.5 minute |
| Fixing | 1.5 minutes |
| Washing | 3 minutes |
| Drying | |

The developer bath contains the following components per liter of solution:

| Sodium sulfite | 38.0 g |
|---|---|
| Potassium sulfite | 19.9 g |
| Lithium sulfite | 0.6 g |
| 1-Phenyl-3-pyrazolidinone | 1.0 g |
| Hydroquinone | 12.0 g |
| Potassium carbonate | 29.1 g |
| Potassium bromide | 1.5 g |
| Benzotriazole | 0.5 g |
| Ethylenediaminetetraacetic acid (sodium salt) | 4.0 g |

The silver bleach bath has the following composition per liter of solution:

| Concentrated sulfuric acid | 56.2 g |
|---|---|
| m-Nitrobenzenesulfonic acid (sodium salt) | 6.0 g |
| Potassium iodide | 8.0 g |
| Hydroxyethylpyridinium chloride | 2.4 g |
| 2,3-Dimethylquinoxaline | 2.5 g |
| 4-Mercaptobutyric acid | 1.8 g |

The fixing bath contains per liter of solution:

| Ammonium thiosulfate | 200 g |
|---|---|
| Ammonium metabisulfite | 24 g |

The result obtained is a light-fast colour wedge having a deep molecular extinction coefficient at 350 nm in the unbleached areas (cf. Table 2).

The other dyes according to the invention can be incorporated into the layers of photographic materials in analogous manner. Table 2 shows the amounts of incorporated dye and the corresponding molar extinction coefficients in the layer of the photographic material.

TABLE 2

| Dye of the formula | Amount (mg) | ξ (350 nm) |
|---|---|---|
| 101 (comparison) | 364 | 15 400 |
| 102 | 412 | 25 000 |
| 103 | 412 | 28 100 |
| 104 | 454 | 36 200 |
| 201 (comparison) | 468 | 22 800 |
| 202 | 565 | 34 200 |
| 203 | 564 | 41 800 |
| 204 | 669 | 44 700 |
| 205 (comparison) | 464 | 21 000 |
| 206 | 591 | 39 000 |
| 207 | 590 | 36 000 |
| 208 | 645 | 44 500 |
| 209 | 617 | 43 900 |
| 301 (comparison) | 383 | 12 700 |
| 302 | 480 | 20 200 |
| 303 | 479 | 23 800 |
| 401 (comparison) | 611 | 28 900 |
| 402 | 705 | 38 400 |
| 403 | 707 | 41 900 |
| 404 | 811 | 41 900 |
| 405 | 711 | 40 200 |
| 406 | 540 | 39 900 |
| 407 | 620 | 39 100 |

The table illustrates that the UV absorption of the compounds according to the invention in photographic material is significantly higher than that of the corresponding comparative compounds without UV-absorbent groups. The comparative compounds of the formulae (201), (205), (301) and (401) have the following structures:

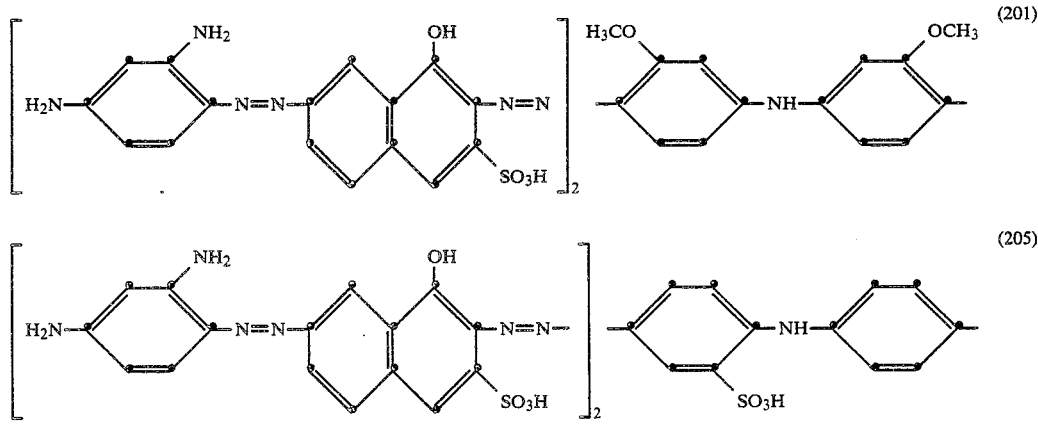

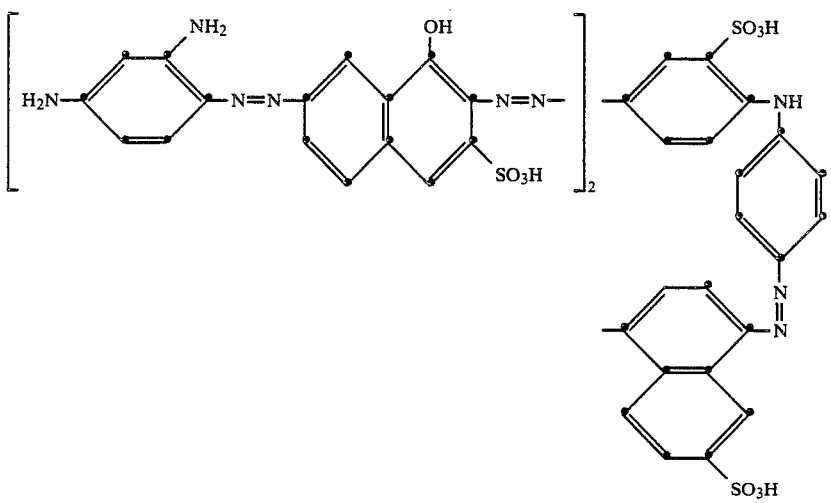

The comparative compounds only differ from the corresponding compounds accordi,ng to the invention in the groups B and B'.

Example 20

633 mg of dye of the formula (206) are dissolved in 56 ml of water and added to a mixture of 42 ml of 3.7% aqueous gelatin solution, 1 ml of an 8% solution of the sodium salt of dibutylnaphthalenesulfonic acid and 12 g of a spectrally non-sensitised gelatin silver chloroiodobromide emulsion which contains about 140 g of silver and 70 g of gelatin per kilogram.

This mixture is cast together with a protective layer consisting of 37.4 ml of 3.9% aqueous gelatin solution, 1 ml of a 6% solution of the sodium salt of the bis-2-ethylhexyl ester of sulfosuccinic acid, 1 ml of a 3% solution of a fatty acid alkanolamide and 0.6 ml of a 10% solution of formaldehyde on to 1 m² of a polyester substrate and dried.

A microfiche was exposed on to the light-sensitive material thus obtained in a manner known per se and processed as described in Example 19.

The processed photographic material had a maximum density of 1.70 as measured by a UV filter of the Wratten 18 A type.

Duplication on to a diazo material produced copies of good quality in an exposure time of 4 seconds compared with 5 seconds for a commercially available silver microfilm.

We claim:

1. Photographic silver dye bleach material which contains in at least one silver halide emulsion layer or in a layer adjacent to it, a compound of the formula $$(B-L)_m A-(L'-B')_n \quad (1)$$

in which A is the radical of a bisazo or trisazo dye, L and L' are identical or different from each other and denote bridge members, B and B' are identical or different from each other and denote aromatic radicals, at least one of the radicals B and B' having spectral absorption in the UV region, and m is 1 or 2 and n is 0, 1 or 2, provided that if n is 0, B has spectral absorption in the UV region.

2. Photographic silver dye bleach material according to claim 1, which is a monochromic material.

3. A process for the preparation of copies of a diazotype method which comprises exposing onto a diazotype material by means of UV light or light having a high UV content, as an original, a photographic image prepared with the photographic silver dye bleach material according to claim 1 by imagewise exposure, silver development, dye and silver bleaching and fixing.

* * * * *

UNITED STATES PATENT AND TRADEMARK OFFICE
CERTIFICATE OF CORRECTION

PATENT NO. : 4,609,609
DATED : September 2, 1986
INVENTOR(S) : Thomas-Markus Rohr, et al.

It is certified that error appears in the above-identified patent and that said Letters Patent are hereby corrected as shown below:

| | |
|---|---|
| Col. 3, line 59 | Before "which" insert --in-- |
| Col. 8, line 49 | Delete formula "7a" and substitute --(7a) B'-H-- |
| Col. 8, line 54 | Delete formula "(1a)" and substitute -- $(B-N=N)_m-A-(N=N-B')_n$ (1a)-- |
| Col. 8, line 65 | Delete formula under "(9)" and substitute --(9a) B'-L'-halogen-- |
| Col. 9, line 1 | Delete formula and substitute -- $(B-L)_m-A-(L'-B')_n$ (1b) -- |
| Col. 10, line 12 | Delete "silvercomplexing" and substitute --silver-complexing-- |
| Col. 11, line 5 | After "g/l" delete ";" and substitute --,-- |
| Col. 19, line 18 | Before formula insert -- 302 a)-- |
| Col. 29, line 32 | Delete "according" and substitute --according-- |

Signed and Sealed this

Thirtieth Day of December, 1986

Attest:

DONALD J. QUIGG

Attesting Officer     Commissioner of Patents and Trademarks